June 27, 1961  W. B. GRAYBILL  2,990,341
PROCESS FOR CONCENTRATING HYDROGEN PEROXIDE
Filed Aug. 27, 1956
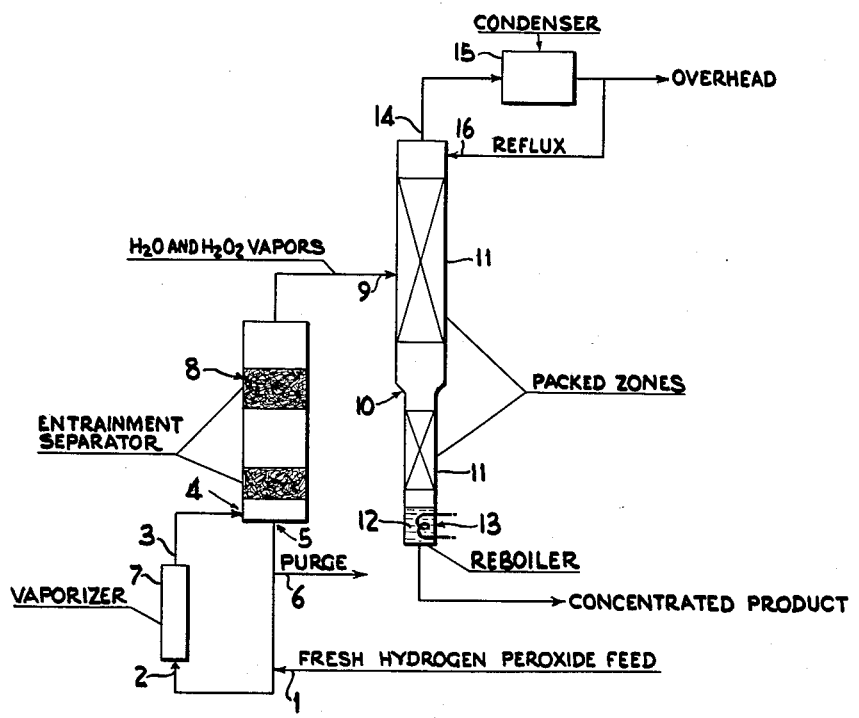
INVENTOR.
WILMER B. GRAYBILL
BY
Oscar L. Spencer
ATTORNEY

United States Patent Office 2,990,341
Patented June 27, 1961

2,990,341
PROCESS FOR CONCENTRATING HYDROGEN PEROXIDE
Wilmer B. Graybill, Corpus Christi, Tex., assignor, by mesne assignments, to Pittsburgh Plate Glass Company
Filed Aug. 27, 1956, Ser. No. 606,296
1 Claim. (Cl. 202—46)

The present invention deals with the manufacture of aqeous hydrogen peroxide solutions, and more particularly involves the manufacture of highly concentrated aqueous hydrogen peroxide solutions.

Hydrogen peroxide as directly generated by chemical reaction is usually as a dilute aqueous hydrogen peroxide solution. One preparation of hydrogen peroxide involves hydrogenating with elemental hydrogen an organic compound capable of autoxidation such as an alkyl anthraquinone to its hydroquinone or quinol state and thereafter oxidizing the hydrogenated quinone derivatives. Hydrogen peroxide is generated as a consequence of the oxidation. As normally operated, the hydrogenation and oxidation is effected in the reaction medium which includes a solvent or solvents for the autoxidizable materials as well as for the hydrogen peroxide.

Hydrogen peroxide is recovered from the solvents, for example, by water extraction providing an aqueous hydrogen peroxide solution. In these solutions, the hydrogen peroxide concentration is quite low, usually on the order of 8 to 16 percent hydrogen peroxide by weight of the solution.

Other processes for preparing hydrogen peroxide likewise rarely, if ever, prepare directly substantially more concentated hydrogen peroxide solutions.

Dilute hydrogen peroxide solutions may be converted to more enriched hydrogen peroxide solutions of 25 to 30 weight percent strengths or even somewhat higher. However, the winning of considerably more concentrated hydrogen peroxide solutions of say 70 to 90 weight percent hydrogen peroxide or higher is not nearly as simple. Thus, although highly concentrated aqueous hydrogen peroxide solutions have heretofore been prepared by concentration techniques, the concentration has been accomplished under commercially unattractive conditions such as in small volumes more akin to laboratory scale instead of commercial operation and by multiple distillations.

The present invention provides a simple and efficient process for obtaining from dilute aqueous hydrogen peroxide solutions highly concentrated aqueous hydrogen peroxide solution containing upwards of 70 percent and as high as 90 to 95 percent hydrogen peroxide by weight. It accomplishes these ends on a scale and with the safety and equipment befitting commercial operations. It obviates the need for a multiplicity of distillations and the attendant equipment demands. When conducted according to optimum conditions and embodiments hereof, the present invention concurrently purifies aqueous hydrogen peroxide solutions, notably by removing carbonaceous impurities.

Accordingly, it now has been discovered that aqueous hydrogen peroxide solutions exceeding 70 weight percent hydrogen peroxide strengths may be obtained by charging dilute aqueous hydrogen peroxide of upwards of 8 weight percent hydrogen peroxide content to a liquid body of aqueous hydrogen peroxide at vaporizing temperatures and under vacuum. Vapors of water and hydrogen peroxide are formed often including entrained liquid. This entrained liquid may be removed, if desired, and the vapors are fed into an intermediate section of a liquid-gas contact zone under vacuum. Vapors of a water-hydrogen peroxide composition corresponding to the vapors in equilibrium with an aqueous hydrogen peroxide solution of at least 70 percent hydrogen peroxide under temperature and vacuum conditions prevailing in the zone are fed to the zone at a point vertically beneath the said intermediate point.

Under typical vacuum and temperature conditions prevailing, e.g. 150° F. to 160° F. and 35 to 50 millimeters' mercury pressure, vapor mixtures comprised of from 25 to 70 weight percent hydrogen peroxide basis the water and hydrogen peroxide constitute the feed. Of course, other conditions may alter somewhat the precise vapor composition used.

The effect in the gas-liquid contact zone may be described as a stripping action in which the vapors fed at the lower point preferentially remove water vapors from the zone's contents and become depleted in hydrogen peroxide. Thus, a rising gas stream is present which is progressively richer in water vapor and leaner in peroxide vapors. Countercurrent to the rising gas stream is a downwardly flowing stream which progressively becomes enriched in hydrogen peroxide and depleted of water. This downwardly flowing stream is under the prevailing conditions a liquid which is subjected to stripping by the rising gas stream.

When the liquid-gas contact zone is packed or otherwise provided with means for facilitating fractionation above the intermediate point, the overhead product withdrawn from the zone is less rich in hydrogen peroxide than either of the feeds. With adequate fractionation in the upper section of these zones, the overhead may be essentially hydrogen peroxide-free water vapors. As will hereinafter be more carefully explained, the overhead may be condensed and a portion returned as reflux.

As the descending liquid stream becomes progressively richer in hydrogen peroxide, it approximates or equals the hydrogen peroxide concentration of the liquid which would be in equilibrium with the vapor composition introduced into the lower section of the zone. Since the quantity of concentrated hydrogen peroxide required to generate the necessary vapors for introduction in the lower portion of a zone is but a small fraction of the concentrated hydrogen peroxide which may be collected as underflow from the zone, the overall effect of the process is to obtain large quantities of concentrated hydrogen peroxide aqueous solutions at the expense of but a fraction of the volume of equivalent concentrated peroxide solutions.

A further embodiment of the present invention involves utilizing the underflow from the liquid-gas contact zone as the direct source for the vapors which are introduced into the lower portion of that zone.

According to a still further embodiment, this vaporization is accomplished by heating the liquid underflow collected in the lowermost portion of the zone while it is in liquid-vapor communication with the zone to volatilize a fraction of the underflow as vapor feed to the lower portion of the zone. This ability to heat directly the underflow and volatilize aqueous hydrogen peroxide solutions of such high strength without undue contamination and hazard represents a marked advance in the concentration of aqueous hydrogen peroxide solutions. It is in part at least to the sequential steps hereinbefore outlined which apparently are responsible for providing as underflow a highly concentrated aqueous hydrogen peroxide solution of such quality that explosive hazards are substantially minimized if not precluded.

The invention being more readily described by reference to a flow sheet, it will hereinafter be discussed with reference thereto as shown in the drawings. It is to be understood that such description is for convenience and the invention is not to be construed as being so restricted.

Dilute aqueous hydrogen peroxide ranging from 8 to 16 percent by weight hydrogen peroxide concentration is fed to the concentration and/or purification system typifying the present invention at point 1 in the cyclic arrangement denoted by numerals 1 through 6 inclusive. As it enters this circuit, this dilute hydrogen peroxide solution is admixed with a more concentrated hydrogen peroxide solution. Under most circumstances, the concentration of hydrogen peroxide in the aqueous solution in this circuit is approximately 1.6 to 6.5 times that of this feed concentration but not greater than 83 weight percent. The ratio of the volume of dilute aqueous hydrogen peroxide fed at 1 to the total volume of aqueous hydrogen peroxide in the closed circuit is sufficiently low such that there is no appreciable decrease in the overall concentration of the aqueous hydrogen peroxide of the circuit. The manner in which the concentration of aqueous hydrogen peroxide in the closed circuit is provided will be fully apparent from the ensuing description.

In this closed circuit, the aqueous hydrogen peroxide solution circulates at a rapid rate in the indicated direction. At point 2 in the circuit, the solution is passed upwardly through vaporizer 7 where heat is supplied. This vaporizer is typically constructed of nickel and may be a thermo-syphon vaporizer. This heating volatilizes the material in the system and the contents of the system are kept in their circulatory motion by the resulting syphon-type effect. Observation of the contents of this circuit indicates that the liquid is more in the nature of a boiling body containing vapor bubbles.

At 4 in the circuit, the contents spill into the lower portion of entrainment separator 8 wherein the water and peroxide vapors including entrained liquids rise. Separation of the entrained liquid is facilitated by including zones in the entrainment separator which are comprised of fiber glass or other equivalent materials. The entrained liquid is separated from the water and peroxide vapors and returns to the lower portion of the entrainment separator. There it combines with the material being circulated in the circulatory system.

Emanating from entrainment separator 8 are the water and hydrogen peroxide vapors substantially free from entrained liquid. The hydrogen peroxide content of these overhead vapors from the entrainment separator usually roughly correspond to the concentration of the hydrogen peroxide feed introduced at 1. There may be some slight dilution.

These vapors are then introduced to an intermediate section of a liquid-gas contact column 10. In one specific form of contact column 10, two distinct packed zones 11 are provided. The vapors of water and hydrogen peroxide are introduced into the uppermost of the packed zones. At the lower end of column 10, a liquid body 12 of concentrated hydrogen peroxide is maintained of a hydrogen peroxide corresponding to the desired hydrogen peroxide concentration in the ultimate product herein desired. This peroxide concentration is substantially greater than the peroxide content of the vapors introduced at 9. This liquid body 12 is maintained at a temperature corresponding to its boiling point under the pressure conditions of column 10 by heating. Reboiler 13 constitutes this heat introducing means. The amount of heat introduced into the liquid body 12 is regulated such that but a portion of the liquid body is volatilized to form a rising stream of hydrogen peroxide and water vapors which initially has a composition corresponding to the liquid-vapor equilibrium under the specified conditions.

These vapors gradually rise upwardly through column 10 intimately contacting the water and hydrogen peroxide vapors introduced at the intermediate point 9 of column 10. Below intermediate feed point 9, this rising stream is in intimate contact with a downwardly flowing liquid stream of water and hydrogen peroxide. It serves the overall effect of stripping water from the zone and ultimately removing water as overhead.

Overhead is withdrawn from column 10 at point 14 and is condensed in condenser 15 with a portion of the condensate recycled as reflux at point 16. The balance is removed from the system as essentially hydrogen peroxide-free water under ideal or near perfect conditions. Small concentrations of hydrogen peroxide may be tolerated in the overhead. Above intermediate point 9, reflux in the packed zone serves to scrub the rising gas stream of hydrogen peroxide and hence to minimize the concentration of hydrogen peroxide in the overhead.

As the water and hydrogen peroxide vapors introduced at intermediate point 9 in effect descend column 10, they form a stream being gradually depleted of water which ultimately collects in the lower portion of column 10 in pool 12. From pool 12, the concentrated aqueous hydrogen peroxide is removed at a rate such that the volume of pool 12 is essentially constant.

Heating means reboiler 13 may be directly inserted into liquid body 12.

In conjunction with the concentration of dilute aqueous hydrogen peroxide in the manner herein described, the present system is preferably operated to effect purification of the hydrogen peroxide. This purification is both important to the quality of the concentrate and also is believed to enhance the overall operation. Impurities of the character herein concerned are generally termed carbonaceous impurities, and analytically are reported as carbon. It will be understood that although reference is made to the carbon concentration hereinafter, this is merely a measure of carbonaceous materials, probably organic impurities.

It is observed in the operation of this process that the concentration of carbon (organic impurities) in cyclic system 1 to 6 is considerably higher than the carbon concentration in the aqueous hydrogen peroxide feed introduced at 1. As a result, and to avoid a gradually increasing build-up of carbon concentration in the contents of the cyclic system, the cyclic system is periodically or continuously purged at 6. This purge removes only a small portion of the hydrogen peroxide introduced into the entire system at 1. Generally it is on the order of 1 to 3 weight percent of the feed hydrogen peroxide but sometimes larger quantities are purged, e.g. 5 to 8 weight percent. When so purging, the overall effect of the entire concentration system herein described is the production of a concentrated product containing a lower carbon content than the dilute aqueous hydrogen peroxide.

The entire system is operated under subatmospheric conditions with the temperatures employed in vaporizer 7, reboiler 13 and throughout the rest of the system being to some extent interdependent upon the exact subatmospheric pressure in the system. Pressures used are below 100 millimeters of mercury. Within the practical limitations of commercial operation, the lowest possible pressure is preferred; this usually is in the range of 30 to 50 millimeters of mercury pressure. Naturally, the system is maintained substantially airtight and the vacuum provided by recognized equipment. Pressure drops in the system and the actual pressures at different points in the system will vary accordingly.

For the most part, temperatures in vaporizer 7 are on the order of 120 to 150° F. and the liquid temperature in pool 12 generated by reboiler 13 ranges on the order of 135 to 155° F., more notably at about 150° F.

The following example illustrates the invention:

*Example*

Using a system corresponding to that diagrammatically illustrated in the drawing, 1.25 gallons per hour of aqueous hydrogen peroxide containing 40 percent hydrogen peroxide by weight and 0.16 gram per liter of carbonaceous impurities measured as carbon was fed to a circulating body of aqueous hydrogen peroxide containing 73.5 percent by weight hydrogen peroxide and 2.3 grams per liter of carbon. This body of aqueous hydrogen peroxide was circulated as illustrated upwardly through a nickel vertical vaporizer operated at 144° F. The resulting mixture of water and hydrogen peroxide vapors were passed upwardly through an entrainment separator wherein entrained liquid was separated from the vapors and the essentially liquid free hydrogen peroxide and water vapors emanating from the separator were fed into the upper section of a liquid-gas contact tower. The vapors at this point contain about 39.1 percent hydrogen peroxide by weight.

The liquid-gas contact tower was comprised of an upper section 6 inches in diameter and 10 feet high. This section was packed with ¾ inch Raschig rings. The lower section of the gas-liquid contact tower was 6 feet high and 4 inches in diameter. It was packed with ½ inch Raschig rings. A 99.6 percent pure aluminum finger reboiler was employed to maintain the temperature of the liquid in the reboiler at the lower extremity of the liquid-gas contact tower at 158° F.

Overhead from the liquid-gas contact tower was condensed. This condensate was essentially free of hydrogen peroxide. Deionized water was fed to the top of the zone at 0.702 gallon per hour as reflux.

Underflow from the liquid-gas contact tower was removed at the rate of 0.45 gallon per hour and comprised an aqueous hydrogen peroxide solution containing 88.83 weight percent hydrogen peroxide and 0.24 gram per liter of carbon impurities.

The entire system was under vacuum with the vacuum being applied to the upper end of the contact tower. This vacuum was approximately 35 millimeters of mercury pressure. At other points in the system, the subatmospheric pressure was somewhat greater due to pressure differentials.

A purge stream was continuously withdrawn from the liquid body of aqueous hydrogen peroxide which is vaporized into the entrainment separator. This purge stream had a composition corresponding to the composition which is subjected to vaporization. The rate of purge was such that the hydrogen peroxide removed thereby amounted to approximately 5 percent of the total hydrogen peroxide fed to the system. In this instance, the purge served the purpose of protecting against the build-up of large concentrations of carbon impurities in the purged body.

By specific reference to the above example, it will be seen that the therein described process permits the obtention of highly concentrated aqueous hydrogen peroxide solutions from considerably more dilute aqueous hydrogen peroxide. In lieu of the aqueous hydrogen peroxide containing 40 percent hydrogen peroxide by weight, more dilute or more concentrated aqueous hydrogen peroxide solutions are useful. Solutions containing on the order of 8 to 50 percent hydrogen peroxide by weight can be concentrated in the foregoing manner.

By introducing a mixture of water and hydrogen peroxide vapors into an intermediate point of a liquid-gas contact zone and feeding into the lower extremity of such zone a vapor mixture of hydrogen peroxide and water having a composition corresponding to the vapor composition provided by vaporizing aqueous hydrogen peroxide of the requisite highly concentrated desired hydrogen peroxide product, the more dilute vapor mixture introduced at the intermediate point in the column is concentrated to a point equivalent to the liquid composition in equilibrium with the vapors introduced at the lower extremity.

Although the present invention has been described with reference to the specific details and certain embodiments, it is not intended that such details be construed as limitations upon the scope of the invention except insofar as they appear in the appended claim.

What is claimed:

A method of concentrating aqueous hydrogen peroxide solutions containing between 8 and 50 percent hydrogen peroxide by weight which comprises feeding said peroxide solutions to a body of aqueous hydrogen peroxide containing a hydrogen peroxide concentration which ranges from 1.6 to 6.5 times that of said feed but is below 83 percent hydrogen peroxide by weight, the rate of said feed being such that the hydrogen peroxide solution of said liquid body is not appreciably altered, vaporizing under vacuum the aqueous hydrogen peroxide solutions to form vapors of water and hydrogen peroxide in entrained liquid, separating the entrained liquid, introducing the resulting vapors to an intermediate section of a liquid gas contact zone under vacuum, introducing to the zone below the intermediate point vapors of a composition corresponding to the vapor composition provided by vaporizing aqueous hydrogen peroxide of at least 70 percent hydrogen peroxide by weight under the temperature and subatmospheric conditions prevailing in said zone, said vapor being obtained from a pool of hydrogen peroxide maintained in said zone, said pool having substantially the same cross-sectional area as the portion of the column immediately above it and having a hydrogen peroxide concentration of at least 70 percent by weight, thereby establishing a downwardly flowing stream of hydrogen peroxide and water which progressively becomes enriched in peroxide and an upwardly flowing stream intimately in contact therewith which as it ascends in the column becomes depleted of hydrogen peroxide, removing as overhead vapors less rich in peroxide than either the feed or the vapors obtained from said pool, collecting as underflow in said pool an enriched hydrogen peroxide composition and vaporizing a portion of said pool by directly contacting the pool with a 99.6 percent pure aluminum finger reboiler to provide the vapors fed to the zone below the intermediate point.

References Cited in the file of this patent

UNITED STATES PATENTS

| | | |
|---|---|---|
| 2,178,496 | Schmidt | Oct. 31, 1939 |
| 2,298,064 | MacMullin | Oct. 6, 1942 |
| 2,520,870 | Wood et al. | Aug. 29, 1950 |
| 2,684,889 | Crewson et al. | July 27, 1954 |
| 2,804,376 | Haller et al. | Aug. 27, 1957 |
| 2,819,949 | Keeler et al. | Jan. 14, 1958 |
| 2,820,001 | Van Dijck et al. | Jan. 14, 1958 |
| 2,869,989 | Keeler et al. | Jan. 20, 1959 |

OTHER REFERENCES

Robinson et al.: "Elements of Fractional Distillation" (1950), pages 125–127.